(12) United States Patent
Ozaki et al.

(10) Patent No.: US 11,544,016 B2
(45) Date of Patent: Jan. 3, 2023

(54) INFORMATION PROCESSING SYSTEM, IMAGE PROCESSING APPARATUS, INFORMATION PROCESSING METHOD, AND RECORDING MEDIUM FOR USING STORED FEATURED VALUES TO FORM AN IMAGE

(71) Applicants: Tatsuya Ozaki, Kanagawa (JP); Shinichiroh Wada, Kanagawa (JP)

(72) Inventors: Tatsuya Ozaki, Kanagawa (JP); Shinichiroh Wada, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/375,010

(22) Filed: Jul. 14, 2021

(65) Prior Publication Data

US 2022/0019391 A1    Jan. 20, 2022

(30) Foreign Application Priority Data

Jul. 15, 2020  (JP) .............................. JP2020-121327

(51) Int. Cl.
*G06F 3/12*    (2006.01)

(52) U.S. Cl.
CPC .......... *G06F 3/1222* (2013.01); *G06F 3/1238* (2013.01); *G06F 3/1285* (2013.01)

(58) Field of Classification Search
None
See application file for complete search history.

(56) References Cited

U.S. PATENT DOCUMENTS

| | | |
|---|---|---|
| 5,194,879 A | 3/1993 | Kotabe et al. |
| 5,565,907 A | 10/1996 | Wada et al. |
| 5,892,595 A | 4/1999 | Yamakawa et al. |
| 5,949,922 A | 9/1999 | Wada et al. |

(Continued)

FOREIGN PATENT DOCUMENTS

| | | | |
|---|---|---|---|
| JP | 11355557 A | * | 12/1999 |
| JP | 2002-359740 | | 12/2002 |

(Continued)

OTHER PUBLICATIONS

English Translation of JP 11-119851, corresponding to Japanese Patent Application Publication 11-355557. (Year: 1999).*

(Continued)

*Primary Examiner* — Thomas D Lee
(74) *Attorney, Agent, or Firm* — Xsensus LLP

(57) ABSTRACT

An information processing system includes a server including a memory that stores a registered feature value of data and first circuitry, and an image processing apparatus connectable via a network to the server. The image processing apparatus includes second circuitry to extract a feature value from data and transmit the feature value to the server. The first circuitry receives the feature value transmitted from the image processing apparatus, outputs an output setting depending on whether the received feature value matches the registered feature value in the memory, and transmits the output setting to the image processing apparatus. The second circuitry receives, from the server, the output setting associated with the feature value, and instructs an image forming device to form an image based on the output setting.

20 Claims, 19 Drawing Sheets

(56) References Cited

U.S. PATENT DOCUMENTS

| | | | |
|---|---|---|---|
| 5,949,924 | A | 9/1999 | Noguchi et al. |
| 6,023,537 | A | 2/2000 | Wada et al. |
| 6,023,538 | A | 2/2000 | Noguchi et al. |
| 6,078,703 | A | 6/2000 | Noguchi et al. |
| 6,122,412 | A | 9/2000 | Noguchi et al. |
| 2004/0057087 | A1 | 3/2004 | Wada |
| 2004/0061893 | A1 | 4/2004 | Wada |
| 2006/0238824 | A1* | 10/2006 | Otake ............... H04N 1/32138 358/448 |
| 2007/0196017 | A1* | 8/2007 | Shimazawa ........ H04N 1/32352 382/203 |
| 2008/0151288 | A1 | 6/2008 | Matsunoshita |
| 2016/0105584 | A1 | 4/2016 | Roche et al. |
| 2017/0019547 | A1 | 1/2017 | Ozaki |
| 2017/0295298 | A1 | 10/2017 | Ozaki et al. |
| 2019/0238717 | A1 | 8/2019 | Inage et al. |
| 2020/0120224 | A1 | 4/2020 | Sasa et al. |
| 2020/0120225 | A1 | 4/2020 | Oyama et al. |
| 2020/0120228 | A1 | 4/2020 | Ozaki et al. |
| 2020/0137262 | A1 | 4/2020 | Kubo et al. |
| 2020/0195802 | A1 | 6/2020 | Moro |
| 2020/0244837 | A1 | 7/2020 | Tsukahara et al. |
| 2020/0252513 | A1 | 8/2020 | Nakada et al. |
| 2020/0296255 | A1 | 9/2020 | Hashimoto et al. |
| 2020/0336615 | A1 | 10/2020 | Ono et al. |
| 2021/0099614 | A1 | 4/2021 | Ozaki et al. |

FOREIGN PATENT DOCUMENTS

| | | | |
|---|---|---|---|
| JP | 2007013836 A | * | 1/2007 |
| JP | 2007306295 A | * | 11/2007 |
| JP | 2008098948 A | * | 4/2008 |
| JP | 2008-268588 | | 11/2008 |
| JP | 2009239612 A | * | 10/2009 |
| JP | 2010130667 A | * | 6/2010 |
| JP | 2016-111555 | | 6/2016 |

OTHER PUBLICATIONS

English Translation of JP 2005-194726, corresponding to Japanese Patent Application Publication 2007-013836. (Year: 2005).*
English Translation of JP 2006-132398, corresponding to Japanese Patent Application Publication 2007-306295. (Year: 2006).*
English Translation of JP 2006-278105, corresponding to Japanese Patent Application Publication 2008-098948. (Year: 2006).*
English Translation of JP 2008-083033, corresponding to Japanese Patent Application Publication 2009-239612. (Year: 2008).*
English Translation of JP 2008-306813, corresponding to Japanese Patent Application Publication 2010-130667. (Year: 2008).*
U.S. Appl. No. 16/952,103, filed Nov. 19, 2020, Tatsuya Ozaki, et al.
U.S. Appl. No. 08/776,762, filed Jan. 6, 1997, Shinji Yamakawa,et al.
Extended European Search Report dated Dec. 9, 2021 in European Patent Application No. 21185842.8, 8 pages.

* cited by examiner

FIG. 9

RESIDENCE CARD

ORIGIN (0,0)

| NAME | BIRTH DATE | GENDER | RELATIONSHIP | HOUSEHOLDER | RESIDENCY START DATE | PIN |
|---|---|---|---|---|---|---|
| ABCD | H2.3.4 | MEN | HOUSEHOLDER | ABCD | H30.4.1 | 0123456789 |
| | | | | | | RESIDENCE CARD CODE |
| | | | | | | 9876543210 |
| ADDRESS | 2-3 XXXX 1-CHOME, YYY CITY, ZZZ PREFECTURE | | | | | |
| PLACE OF FAMILY REGISTER | 2-3 XXXX 1-CHOME, YYY CITY, ZZZ PREFECTURE | | | HEAD | | ABCD |
| PREVIOUS ADDRESS | 8-7 XXXX 9-CHOME, YYY CITY, ZZZ PREFECTURE | | | | | |
| NOTE | | | | | | |

START COORDINATES (x1,y1)

ABCD

END COORDINATES (x2,y2)

x1, y1, x2, y2 → FEATURE VALUE EXTRACTION

FIG. 11

RESIDENCE CARD

| NAME | BIRTH DATE | GENDER | RELATIONSHIP | HOUSEHOLDER | RESIDENCY START DATE | PIN |
|---|---|---|---|---|---|---|
| ABCD | H2.3.4 | MEN | HOUSEHOLDER | ABCD | H30.4.1 | 0123456789 |
| | | | | | | RESIDENCE CARD CODE |
| | | | | | | 9876543210 |
| ADDRESS | 2-3 XXXX 1-CHOME, YYY CITY, ZZZ PREFECTURE | | | | | |
| PLACE OF FAMILY REGISTER | 2-3 XXXX 1-CHOME, YYY CITY, ZZZ PREFECTURE | | | HEAD | | ABCD |
| PREVIOUS ADDRESS | 8-7 XXXX 9-CHOME, YYY CITY, ZZZ PREFECTURE | | | | | |
| NOTE | | | | | | |

ABCD, H2.3.4, 2-3 XXXX 1-CHOME, YYY CITY, ZZZ PREFECTURE→FEATURE VALUE EXTRACTION

FIG. 13

RESIDENCE CARD

| NAME | BIRTH DATE | GENDER | RELATIONSHIP | HOUSEHOLDER | RESIDENCY START DATE | PIN |
|---|---|---|---|---|---|---|
| ABCD | H2.3.4 | MEN | HOUSEHOLDER | ABCD | H30.4.1 | 0123456789 |
| | | | | | | RESIDENCE CARD CODE |
| | | | | | | 9876543210 |
| ADDRESS | 2-3 XXXX 1-CHOME, YYY CITY, ZZZ PREFECTURE | | | | | |
| PLACE OF FAMILY REGISTER | 2-3 XXXX 1-CHOME, YYY CITY, ZZZ PREFECTURE | | | HEAD | | ABCD |
| PREVIOUS ADDRESS | 8-7 XXXX 9-CHOME, YYY CITY, ZZZ PREFECTURE | | | | | |
| NOTE | uvwxyz ← m | | | | | |

ABCD, H2.3.4, 2-3 XXXX 1-CHOME, YYY CITY, ZZZ PREFECTURE, uvwxyz→FEATURE VALUE EXTRACTION

FIG. 14

RESIDENCE CARD

| NAME | BIRTH DATE | GENDER | RELATIONSHIP | HOUSEHOLDER | RESIDENCY START DATE | PIN |
|---|---|---|---|---|---|---|
| ABCD | H2.3.4 | MEN | HOUSEHOLDER | ABCD | H30.4.1 | 0123456789 |
| | | | | | | RESIDENCE CARD CODE |
| | | | | | | 9876543210 |
| ADDRESS | 2-3 XXXX 1-CHOME, YYY CITY, ZZZ PREFECTURE | | | | | |
| PLACE OF FAMILY REGISTER | 2-3 XXXX 1-CHOME, YYY CITY, ZZZ PREFECTURE | | | | | HEAD |
| | | | | | | ABCD |
| PREVIOUS ADDRESS | 8-7 XXXX 9-CHOME, YYY CITY, ZZZ PREFECTURE | | | | | |
| NOTE | | | | | | | m1 — PRINTABLE WHEN XX IS SATISFIED

FIG. 15

| NAME | BIRTH DATE | GENDER | RELATIONSHIP | HOUSEHOLDER | RESIDENCY START DATE | PIN | |
|---|---|---|---|---|---|---|---|
| ABCD | H2.3.4 | MEN | HOUSEHOLDER | ABCD | H30.4.1 | 0123456789 | |
| | | | | | | RESIDENCE CARD CODE | 9876543210 |
| ADDRESS | 2-3 XXXX 1-CHOME, YYY CITY, ZZZ PREFECTURE | | | | | | |
| PLACE OF FAMILY REGISTER | 2-3 XXXX 1-CHOME, YYY CITY, ZZZ PREFECTURE | | | | HEAD | ABCD | |
| PREVIOUS ADDRESS | 8-7 XXXX 9-CHOME, YYY CITY, ZZZ PREFECTURE | | | | | | |
| NOTE | | | | | | | |

RESIDENCE CARD

COPYING PROHIBITED — m2

FIG. 16

RESIDENCE CARD

| NAME | BIRTH DATE | GENDER | RELATIONSHIP | HOUSEHOLDER | RESIDENCY START DATE | PIN |
|---|---|---|---|---|---|---|
| ABCD | H2.3.4 | MEN | HOUSEHOLDER | ABCD | H30.4.1 | 0123456789 |
| | | | | | | RESIDENCE CARD CODE |
| | | | | | | 9876543210 |
| ADDRESS | 2-3 XXXX 1-CHOME, YYY CITY, ZZZ PREFECTURE | | | | HEAD | ABCD |
| PLACE OF FAMILY REGISTER | 2-3 XXXX 1-CHOME, YYY CITY, ZZZ PREFECTURE | | | | | |
| PREVIOUS ADDRESS | 8-7 XXXX 9-CHOME, YYY CITY, ZZZ PREFECTURE | | | | | |
| NOTE | | | | | | |

NUMBER OF COPIES LIMITED TO 5 TIMES — m3

FIG. 17

| | NAME | BIRTH DATE | GENDER | RELATIONSHIP | HOUSEHOLDER | RESIDENCY START DATE | PIN | 0123456789 |
|---|---|---|---|---|---|---|---|---|
| | ABCD | H2.3.4 | MEN | HOUSEHOLDER | ABCD | H30.4.1 | RESIDENCE CARD CODE | 9876543210 |
| ADDRESS | 2-3 XXXX 1-CHOME, YYY CITY, ZZZ PREFECTURE | | | | | | | |
| PLACE OF FAMILY REGISTER | 2-3 XXXX 1-CHOME, YYY CITY, ZZZ PREFECTURE | | | | | HEAD | ABCD | |
| PREVIOUS ADDRESS | 8-7 XXXX 9-CHOME, YYY CITY, ZZZ PREFECTURE | | | | | | | |
| NOTE | | | | | | | | |

RESIDENCE CARD

COPYING EXPIRATION DATE: 20XX/X/X — m4

FIG. 18

RESIDENCE CARD

| NAME | BIRTH DATE | GENDER | RELATIONSHIP | HOUSEHOLDER | RESIDENCY START DATE | PIN |
|---|---|---|---|---|---|---|
| ABCD | H2.3.4 | MEN | HOUSEHOLDER | ABCD | H30.4.1 | 0123456789 |
| | | | | | | RESIDENCE CARD CODE |
| | | | | | | 9876543210 |

| ADDRESS | 2-3 XXXX 1-CHOME, YYY CITY, ZZZ PREFECTURE | HEAD | ABCD |
|---|---|---|---|
| PLACE OF FAMILY REGISTER | 2-3 XXXX 1-CHOME, YYY CITY, ZZZ PREFECTURE | | |
| PREVIOUS ADDRESS | 8-7 XXXX 9-CHOME, YYY CITY, ZZZ PREFECTURE | | |
| NOTE | | | |

PRINT EXECUTABLE APPARATUS ID: ABCDEF123 m5

FIG. 19

| | BIRTH DATE | GENDER | RELATIONSHIP | HOUSEHOLDER | RESIDENCY START DATE | PIN |
|---|---|---|---|---|---|---|
| NAME | | | | | | 0123456789 |
| ABCD | H2.3.4 | MEN | HOUSEHOLDER | ABCD | H30.4.1 | RESIDENCE CARD CODE |
| | | | | | | 9876543210 |
| ADDRESS | 2-3 XXXX 1-CHOME, YYY CITY, ZZZ PREFECTURE | | | | HEAD | ABCD |
| PLACE OF FAMILY REGISTER | 2-3 XXXX 1-CHOME, YYY CITY, ZZZ PREFECTURE | | | | | |
| PREVIOUS ADDRESS | 8-7 XXXX 9-CHOME, YYY CITY, ZZZ PREFECTURE | | | | | |
| NOTE | | | | | | |

RESIDENCE CARD

PRINT EXECUTABLE USER ID: GHI456789 — m6

INFORMATION PROCESSING SYSTEM, IMAGE PROCESSING APPARATUS, INFORMATION PROCESSING METHOD, AND RECORDING MEDIUM FOR USING STORED FEATURED VALUES TO FORM AN IMAGE

CROSS-REFERENCE TO RELATED APPLICATION

This patent application is based on and claims priority pursuant to 35 U.S.C. § 119(a) to Japanese Patent Application No. 2020-121327, filed on Jul. 15, 2020, in the Japan Patent Office, the entire disclosure of which is hereby incorporated by reference herein.

BACKGROUND

Technical Field

Embodiments of this disclosure relate to an information processing system, an image processing apparatus, a method for processing information, and a recording medium.

Related Art

In recent years, for image forming apparatuses such as color copiers and color printers, there have been proposed techniques for preventing forgery of banknotes, securities, and the like and techniques for preventing falsification of certificate documents and the like containing personal information.

For preventing forgery or falsification, for example, there is a technique of transmitting data including a specific pattern to an external terminal via a network, and executing or stopping image formation according to a reply from the external terminal.

SUMMARY

According to an embodiment of the present disclosure, an information processing system includes a server including a memory that stores a registered feature value of data and first circuitry, and an image processing apparatus connectable via a network to the server. The image processing apparatus includes second circuitry to extract a feature value from data and transmit the feature value to the server. The first circuitry receives the feature value transmitted from the image processing apparatus, outputs an output setting depending on whether the received feature value matches the registered feature value in the memory, and transmits the output setting to the image processing apparatus. The second circuitry receives, from the server, the output setting associated with the feature value, and instructs an image forming device to form an image based on the output setting.

Another embodiment provides a method for restricting replication of data. The method includes extracting a feature value from data, transmitting the feature value to a server, receiving an output setting associated with the feature value from the server, and instructing an image forming device to form an image according to the output setting.

Another embodiment provides a non-transitory recording medium storing a plurality of program codes which, when executed by one or more processors, causes the processors to perform the above-described method.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 9 is a diagram illustrating an example of extracting a feature value from a designated item;

FIG. 11 is a diagram illustrating an example of a case where a printed character itself is extracted as a feature value;

FIG. 13 is a diagram illustrating an example in which invisible information is used as an extraction item of the feature value;

FIG. 14 is a diagram illustrating an example in which a print execution condition is added as invisible information;

FIG. 15 is a diagram illustrating an example in which invisible information indicating whether copying is prohibited is added;

FIG. 16 is a diagram illustrating an example in which invisible information indicating the limitation on the number of copying is add;

FIG. 17 is a diagram illustrating an example in which invisible information indicating a copying expiration date is added;

FIG. 18 is a diagram illustrating an example in which invisible information indicating an apparatus allowed to execute printing; and FIG. 19 is a diagram illustrating an example in which invisible information indicating a user allowed to execute printing is added.

Figure 1:
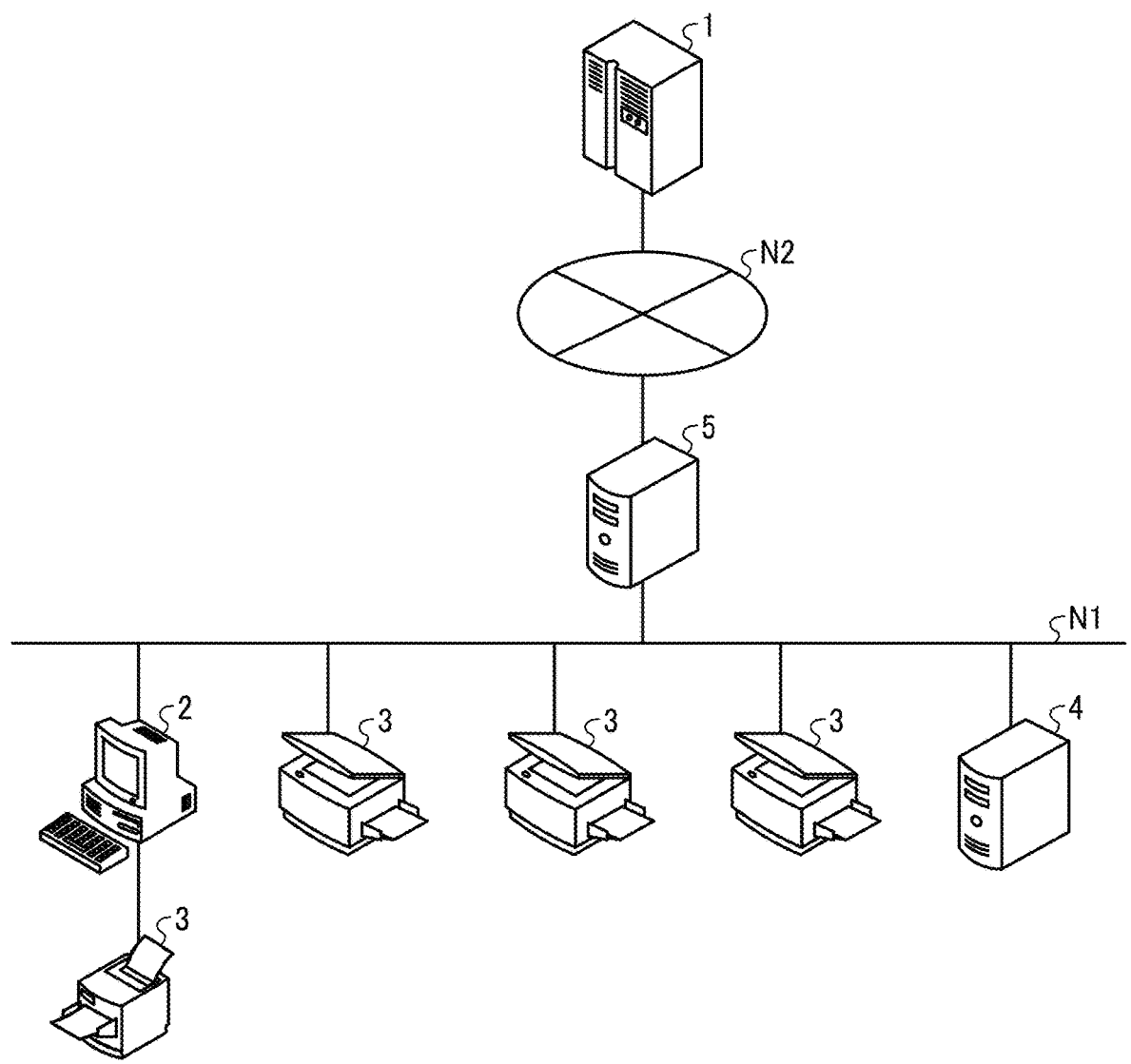
FIG. 1 is a diagram illustrating an example of a network configuration of a cloud printing system according to a first embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Hereinafter, a description is given of an information processing system, an image forming apparatus, and an image processing method according to embodiments of the present disclosure.

A description is given of a first embodiment of the present disclosure.

In the first embodiment, the information processing system is a cloud printing system including an image processing apparatus and an image forming apparatus. In the following, a communication terminal and the image forming apparatus are examples of the "image processing apparatus." The communication terminal is a computer such as a personal computer (PC), a smartphone, a tablet terminal, or the like. The image forming apparatus is an apparatus that forms an image on a medium (e.g., a recording sheet). However, the type of the medium on which an image is formed and the method for forming an image are not particularly limited. Hereinafter, as an example of the image forming apparatus, a printer, a multifunction peripheral (MFP), or the like that prints a text or an image on a paper medium will be described.

FIG. 1 is a diagram illustrating an example of a network configuration of the cloud printing system according to the first embodiment. The cloud printing system includes a cloud print server 1, a communication terminal 2, a plurality of image forming apparatuses 3, a print server 4, and a proxy server 5. The cloud print server 1 illustrated in FIG. 1 is a server that provides, as a Web service, printing by a particular image forming apparatuses 3. In the present embodiment, print settings are restricted using the cloud print server 1.

The cloud print server 1 is provided by a cloud system in which one or more computers are connected. The communication terminal 2 is, for example, a PC, a smartphone, a tablet terminal, or the like. Each image forming apparatus 3 is a printer or an MFP. In addition to the printer function, the MFP may have other functions such as a scanner function and a facsimile function. In FIG. 1, the image forming apparatus 3 directly connected to the communication terminal 2 is a printer. The plurality of image forming apparatuses 3 connected to a network N1 are MFPs. Each MFP illustrated in FIG. 1 has the printer function and the scanner function. The network N1 is, for example, a local area network (LAN) in a public facility, a company, or the like.

The communication terminal 2 and the image forming apparatus 3 are connectable to the cloud print server 1 via a network N2 (the Internet or the like).

Although FIG. 1 illustrates only the network N1 for the sake of explanation, the service of the cloud print server 1 can be used via a plurality of networks at home and from visiting destinations. A user who can use the image forming apparatus 3 of the network N1 may use the cloud print server 1 via a network other than the network N1 illustrated in FIG. 1 from a communication terminal 2 such as a smartphone or a tablet terminal.

The proxy server 5 functions as a management server that controls the image forming apparatuses 3 on the network N1. For example, when communicating with the cloud print server 1, the proxy server 5 converts the address of the image forming apparatus 3 and controls the operation state of the image forming apparatus 3.

The cloud print server 1 illustrated in FIG. 1 provides, for example, the following services. In a first aspect, when a user gives a print instruction on the communication terminal 2 connected to a network other than the network N1, the communication terminal 2 transmits print request information to the cloud print server 1. The cloud print server 1 generates print instruction information (print job or print processing) based on the print request information, and stores the print instruction information in a print information table until an inquiry is transmitted from the image forming apparatus 3. The user who has issued the print instruction makes the inquiry about the print job from the particular image forming apparatus 3. In response to reception of the inquiry, the cloud print server 1 generates print data based on the print instruction information and transmits the print data to the image forming apparatus 3 that has transmitted the inquiry. Further, the cloud print server 1 stores data indicating a feature value of electronic data to be printed in a file F1 (a memory) illustrated in FIG. 2, according to the setting. The feature value of the electronic data to be printed may be generated by the communication terminal 2 or the cloud print server 1.

In a second aspect, in response to a print instruction made by the user on the communication terminal 2 connected to the network N1, the communication terminal 2 transmits print request information to the cloud print server 1 or the print server 4 on the network N1. The print server 4 on the network N1 generates print instruction information based on the print request information, and stores the print instruction information in the print information table of the print server 4 until an inquiry is transmitted from the image forming apparatus 3. In response to reception, from the particular image forming apparatus 3, of an inquiry about the print job by the user who has issued the print instruction, the print server 4 transmits the print data to the image forming apparatus 3. Further, when transmitting the print instruction information, the communication terminal 2 extracts the feature value from the electronic data to be printed (for example, print data based on which an image forming unit 25 illustrated in FIG. 2 forms an image). Then, the communication terminal 2 requests the cloud print server 1 to register the feature value. In response to reception of request to register the feature value, the cloud print server 1 stores the feature value in the file F1.

In the first and second aspects, when the user who has issued the print instruction makes the inquiry about the print job from the particular image forming apparatus 3, the user uses, for example, the same user information (login information or the like) as the user information used in issuing the print instruction. Then, the print data corresponding to the user information of the user who has inquired is transmitted to the image forming apparatus 3.

In a third aspect, the image forming apparatus 3 operates as follows for printing an image acquired by scanning. The image forming apparatus 3 extracts the feature value from the image, transmits the feature value to the cloud print server 1, and performs output such as printing based on the output setting from the cloud print server 1. The output setting is set (e.g., registered) in advance in the cloud print server 1. The output setting is output permission/prohibition information indicating whether or not the image forming apparatus 3 is permitted to output a duplicate by printing or the like. The output setting may include only one of "output permitted" and "output prohibited", or both of "output permitted" and "output prohibited." In addition to "output permitted" and "output prohibited," the output setting may further include "output permitted of a predetermined item (or area)" and "output prohibited of a predetermined item (or area)." In the present embodiment, a description will be given of an example in which the output permission/prohibition information is printing permission/prohibition information indicating whether or not printing is permitted.

A description is given of a configuration of main functional blocks in a case where the cloud printing system restricts printing. Note that a description of a control block for inquiry and acquisition of a print job, which are normal operations, are omitted below.

Figure 2:
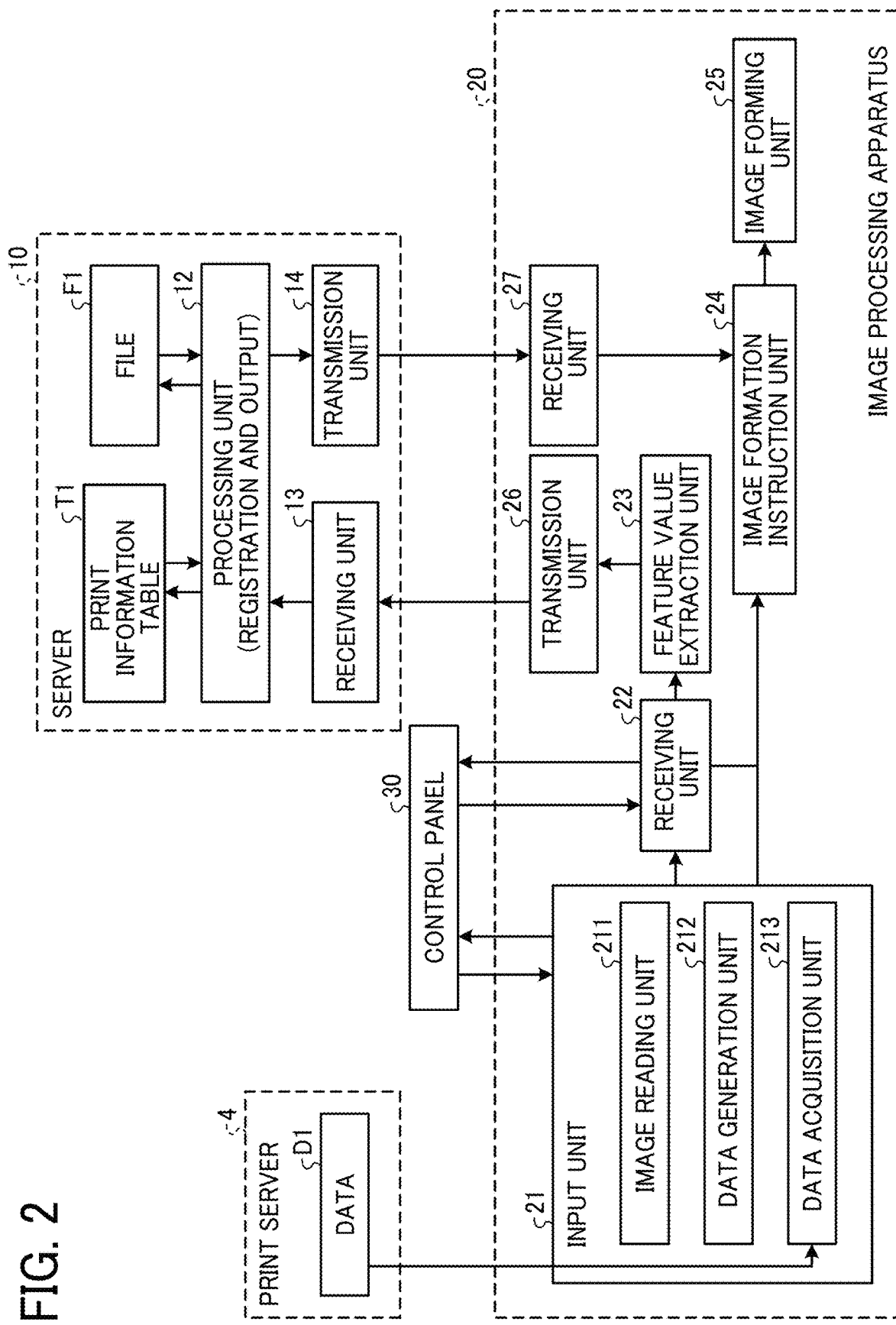
FIG. 2 is a block diagram illustrating an example of a functional configuration of an image processing apparatus and a server of the cloud printing system illustrated in FIG. 1.

FIG. 2 is a block diagram illustrating an example of a functional configuration of an image processing apparatus 20 and a server 10. The server 10 illustrated in FIG. 2 corresponds to the cloud print server 1 illustrated in FIG. 1. The image processing apparatus illustrated in FIG. 2 corresponds to the communication terminal 2 and the image forming apparatus 3 illustrated in FIG. 1. Additionally, or alternatively, the print server 4 can have the configuration of the server 10. Providing the configuration of the server 10 also in the print server 4 is advantageous in that, when communication with the cloud print server 1 is not feasible, the print server 4 can provide the print restriction function. The description of the case where the print server 4 has the configuration of the server 10 is similar to that of the case of the cloud print server 1. In the present embodiment, an example in which the cloud print server 1 has the configuration of the server 10 is described.

The image processing apparatus 20 illustrated in FIG. 2 includes an input unit 21, a receiving unit 22 (a first receiving unit), a feature value extraction unit 23, an image formation instruction unit 24, an image forming unit 25, a transmission unit 26 (a second transmission unit), and a receiving unit 27. For example, the receiving unit 22 is implemented by a central processing unit (CPU), the feature value extraction unit 23 is implemented by a CPU or an integrated circuit (IC) such as an application-specific integrated circuit (ASIC), the image formation instruction unit 24 is implemented by a CPU or an IC, and the image forming unit 25 is implemented by a printer device. Each of the transmission unit 26 and the receiving unit 27 is implemented by a network interface (I/F). Each of the communication terminal 2 and the image forming apparatus 3 includes a part or all of the functional units illustrated in FIG. 2 according to the type and configuration of the communication terminal 2 and the image forming apparatus 3. For example, the communication terminal 2 includes the input unit 21, the receiving unit 22, the feature value extraction unit 23, and the image formation instruction unit 24; and the image forming apparatus 3 includes the image forming unit 25. Alternatively, the image forming apparatus 3 may include the input unit 21, the receiving unit 22, the feature value extraction unit 23, the image formation instruction unit 24, and the image forming unit 25.

The input unit 21 inputs electronic data to be printed. For example, the input unit 21 includes an image reading unit 211, a data generation unit 212, and a data acquisition unit 213. For example, the image reading unit 211 is implemented by a scanner, the data generation unit 212 is implemented by a CPU or an IC, and the data acquisition unit 213 is implemented by a network I/F. The image reading unit 211 is provided in the MFP. The image reading unit 211 reads an original or a copy (copy original) of a document with a scanner, and inputs image data as read data. The data generation unit 212 is provided in the communication terminal 2 and generates electronic data. In this example, the data acquisition unit 213 is mainly included in the MFP, and acquires data from the cloud print server 1, the print server 4, or the like.

The receiving unit 22 receives the signal of operation such as selection or setting of a function of the image forming apparatus 3 from a control panel 30. For example, the control panel 30 displays an operation screen and receives various operation signals by, for example, a touch operation on the operation screen. The functions selected includes, for example, scan execution and print execution.

The feature value extraction unit 23 extracts the feature value from the electronic data to be printed. For example, the feature value extraction unit 23 generates the feature value by, for example, indexing one or a plurality of features of the entire image into numerical values. Specifically, a pattern (a geometric shape, etc.), ruled lines, a color, etc. included in the image are used as the parameters of the feature value. In this case, the feature value has parameters respectively corresponding to a plurality of parts of the image, and the feature value is presentable as a set of numerals individually indexed from the parameters. Alternatively, the distribution of pixel values of the entire image, the frequency spectrum distribution, or the like may be used as the feature value. Yet alternatively, a trained machine learning model in which the features of images are learned from teacher data may be used, and the output from the model may be used as the feature value. In addition, these feature values may be combined as parameters.

The image formation instruction unit 24 generates print data based on the electronic data and instructs the image forming unit 25 to perform printing. The image formation instruction unit 24 is a so-called image processor. When the image formation instruction unit 24 receives printing permission/prohibition information from the server 10 for the electronic data, the image formation instruction unit 24 instructs printing based on the printing permission/prohibition information. For example, when the printing permission/prohibition information indicates that printing is prohibited, execution of printing is cancelled. At this time, a message such as "corresponding data is not found" may be displayed to notify the user that printing is not executable.

In the case of an MFP, the image forming unit 25 is built-in. In the case where the image processing apparatus 20 is the communication terminal 2, the image forming unit 25 is provided in the image forming apparatus 3 that is the output destination. The image forming unit 25 includes, for example, a print head (an image forming device), and performs printing (forms an image) on a sheet based on the print data output from the image formation instruction unit 24.

The transmission unit 26 transmits the request information to the server 10. The receiving unit 27 receives printing permission/prohibition information from the server 10.

The server 10 includes a processing unit 12, a receiving unit 13 (a second receiving unit), and a transmission unit 14 (a second transmission unit) and further includes a memory storing a print information table T1 and a file F1. For example, the processing unit 12 is implemented by a CPU. Each of the transmission unit 13 and the receiving unit 14 is implemented by a network interface I/F. The print information table T1 stores print jobs. The file F1 stores the feature values.

The processing unit 12 processes the request information. For example, when the request information represents a request for registration, the processing unit 12 registers the feature value transmitted from the request source in the file F1. Further, when the request information is a request for printing, the processing unit 12 compares the feature value transmitted from the request source with one or more feature values registered in the file F1 and outputs the printing permission/prohibition information, as the output setting, based on the comparison result. Specifically, the processing unit 12 outputs printing permission/prohibition information indicating printing prohibition when the feature value of the request source satisfies the feature of the feature value of the file F1. Note that whether or not to output permission/prohibition information indicating printing permission when the feature is not satisfied may be appropriately determined. Further, the feature value corresponding to "printing permission" may be stored in the file F1 so that "printing permission" is output when the feature is satisfied. In addition, the feature value corresponding to "printing permission" and feature value corresponding to "printing prohibition" may be distinguished and stored in the file.

The processing unit 12 determines whether to permit printing based on perfect match or the degree of matching. In the case of degree of matching, the processing unit 12 determines whether to permit printing based on, for example, the degree of matching with the feature value registered in the file F1. The processing unit 12 determines the degree of matching based on, for example, whether the distance between the feature values is equal to or smaller than a threshold value or the degree of similarity of the index values.

The receiving unit 13 receives request information. The transmission unit 14 transmits a print restriction instruction.

Next, a description is given of an overall operation performed by the cloud printing system for restricting printing. First, an original registration process is described. The original registration is a process performed for outputting the data generated by the communication terminal 2 as a print to be used as an original, or registering an existing paper original as an original. When reading an original, the image forming apparatus 3 identifies the original by, for example, the form or size of the original.

Figure 3:
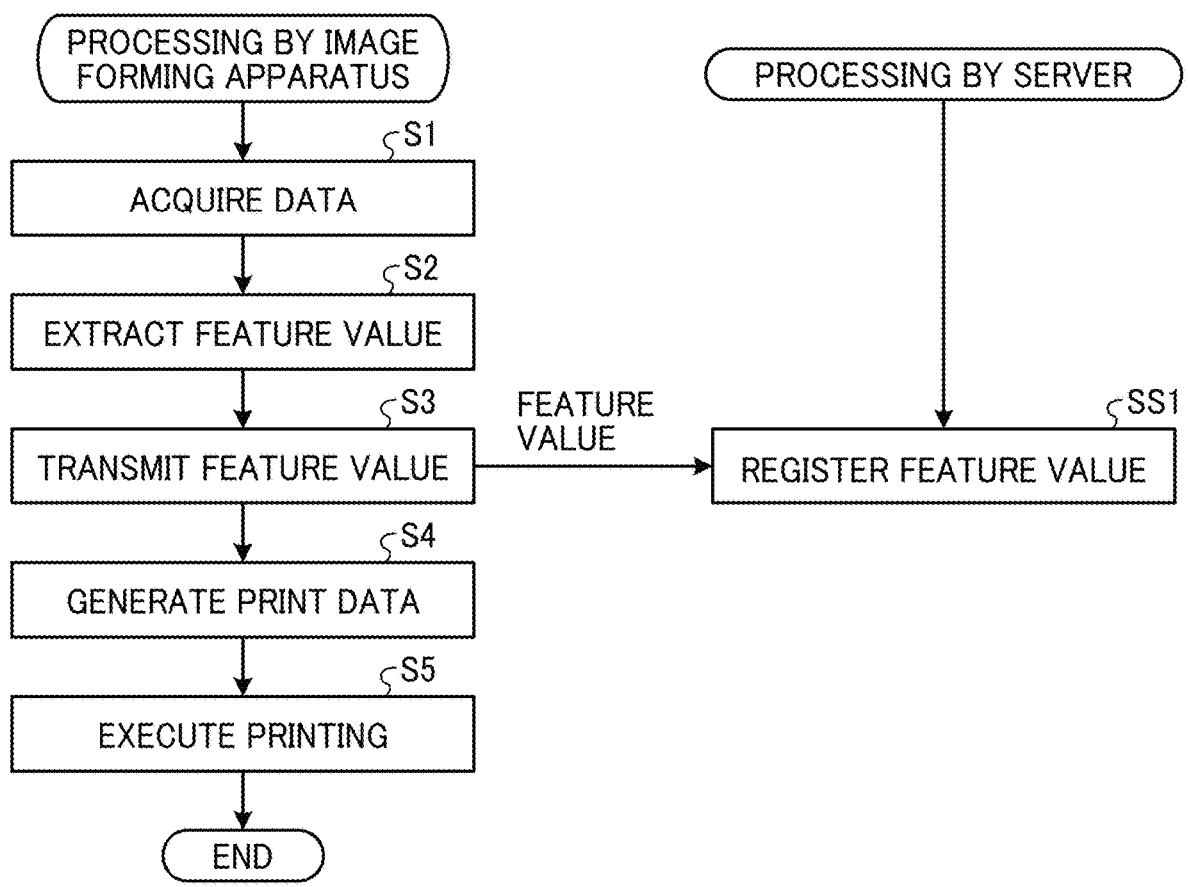
FIG. 3 is a diagram illustrating an example of an original registration process performed by the image processing apparatus illustrated in FIG. 2.

FIG. 3 is a flowchart illustrating an example of a process performed by the image processing apparatus 20, to register an original. First, the image processing apparatus 20 acquires electronic data (step S1). The acquiring of electronic data is, for example, generation of the electronic data by the data generation unit 212.

In response to a print execution operation by the user, the feature value extraction unit 23 of the image processing apparatus 20 extracts the feature value of the electronic data (step S2). The image processing apparatus 20 transmits the feature value to the cloud print server 1 and requests registration thereof (step S3). The user performs the print execution operation, for example, on the control panel 30, and the receiving unit 22 receives the operation.

Further, the image processing apparatus 20 generates print data from the electronic data based on the print execution operation (step S4), and the image forming unit 25 executes printing (step S5). For example, the image formation instruction unit 24 generates print data from the electronic data and transmits the print data to the image forming unit 25.

Meanwhile, receiving the feature value requested to be registered from the image processing apparatus 20, the cloud print server 1 registers the feature value in the file F1 (step SS1).

Figure 4:
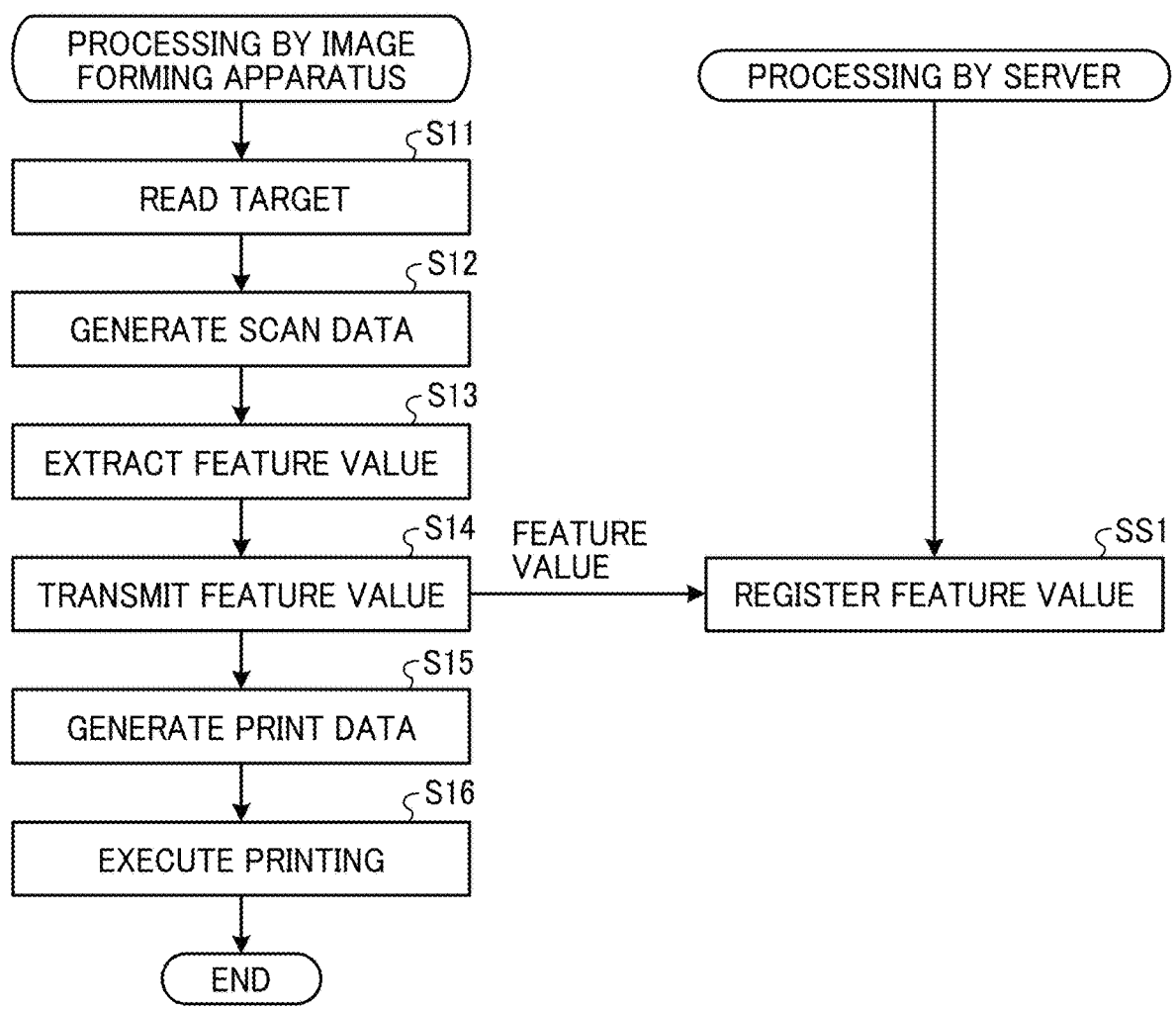
FIG. 4 is a diagram illustrating another example of the original registration process performed by the image processing apparatus illustrated in FIG. 2.

FIG. 4 is a diagram illustrating another example of the process performed by the image processing apparatus 20, to register an original. A description is given of an original registration process when the image forming apparatus 3 copies an original.

First, in response to an operation to execute copying of an original (target to be copied) set by the user, the image forming apparatus 3 reads the original with a scanner (step S11) and generates read data (referred to as scan data) of the original (step S12).

Then, the image forming apparatus 3 extracts the feature value from the scan data (step S13) and transmits the feature value to the cloud print server 1 to request the registration thereof (step S14).

Further, the image forming apparatus 3 generates print data from the scan data (step S15) and executes printing (step S16).

Meanwhile, receiving the feature value requested to be registered from the image forming apparatus 3, the cloud print server 1 registers the feature value in the file F1 as reference data for restricting printing (step SS1).

Subsequently, a normal printing operation is described. The normal printing is processing performed by the image forming apparatus 3, for example, to copy a target document (copying target) or print data acquired from the print server 4. When reading the copying target, the image forming apparatus 3 distinguishes the copying target from the original by, for example, the form or size of the copying target.

Figure 5:
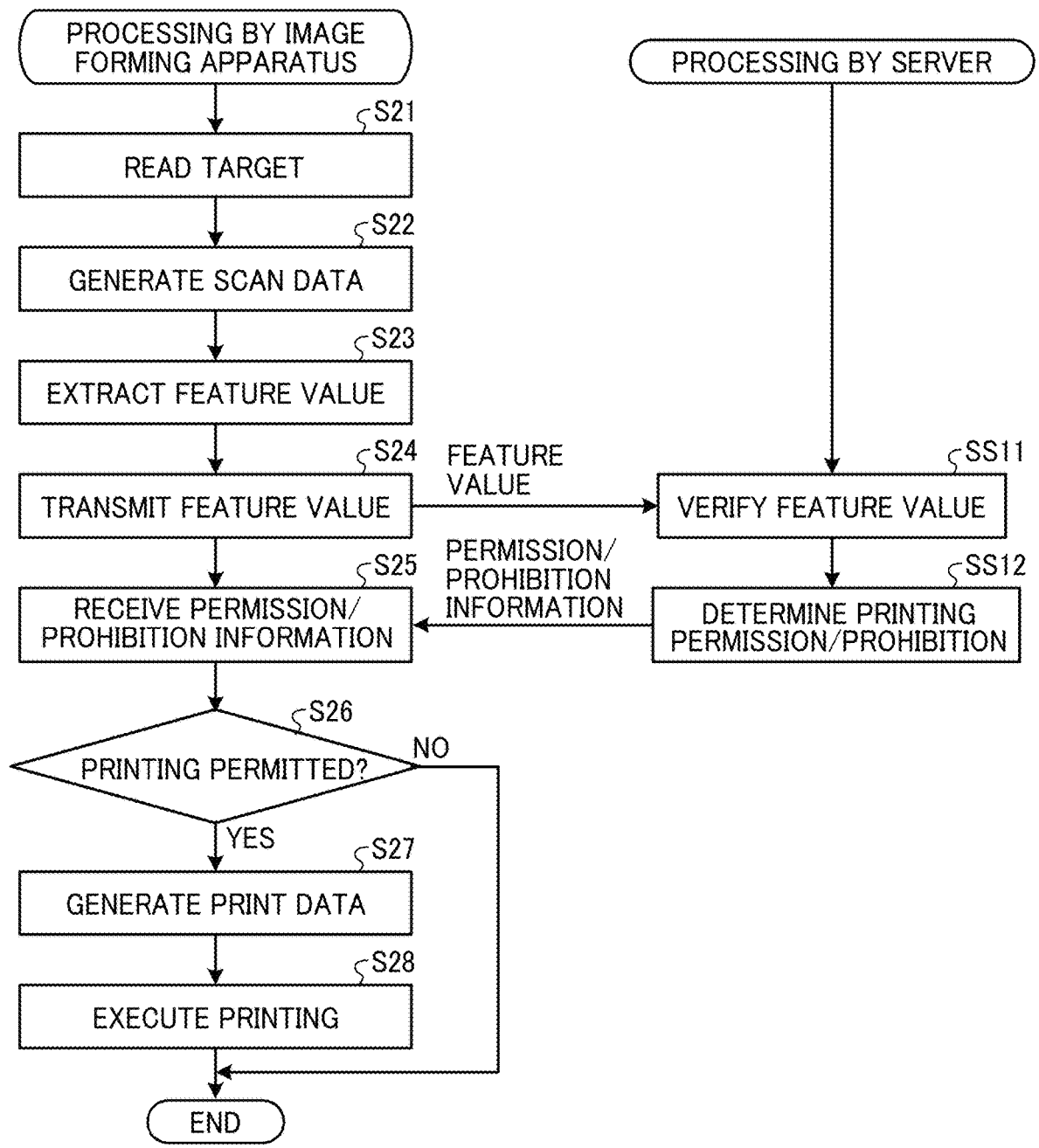
FIG. 5 is a flowchart illustrating an example of a normal printing process in which an image forming apparatus copies a copying target.

FIG. 5 is a flowchart illustrating an example of a process performed by the image forming apparatus 3, to copy a copying target (as normal printing).

When a user sets a copying target in the image forming apparatus 3 and performs an operation to copy the copying target, the image forming apparatus 3 reads the copying target with the scanner (step S21) and generates scan data thereof (step S22).

Then, the image forming apparatus 3 extracts the feature value from the scan data (step S23) and transmits the feature value to the cloud print server 1 to request the verification thereof (step S24).

Receiving the feature value requested to be verified, the cloud print server 1 checks the degree of matching of the feature value with a plurality of feature values registered in the file F1 (step SS11). The cloud print server 1 determines whether printing is permitted and transmits printing permission/prohibition information as a result to the source of the request (step SS12). For example, the cloud print server 1 compares the received feature value with a plurality of feature values registered in the file F1 to verify the feature value. The cloud print server 1 transmits printing prohibition in response to a determination that the degree of matching satisfies a predetermined criterion and transmits printing permission in response to a determination that the predetermined criterion is not satisfied.

When the image forming apparatus 3 receives the printing permission/prohibition information transmitted from the cloud print server 1 (step S25), the image forming apparatus 3 determines whether or not printing is permitted based on the received printing permission/prohibition information (step S26). In response to a determination that printing is permitted (step S26: Yes), the image formation instruction unit 24 of the image forming apparatus 3 generates print data from the scan data (step S27) and instructs the image forming unit 25 to execute printing (step S28). In response to a determination that print is prohibited (step S26: No), the image forming apparatus 3 ends the process in FIG. 5.

Figure 6:
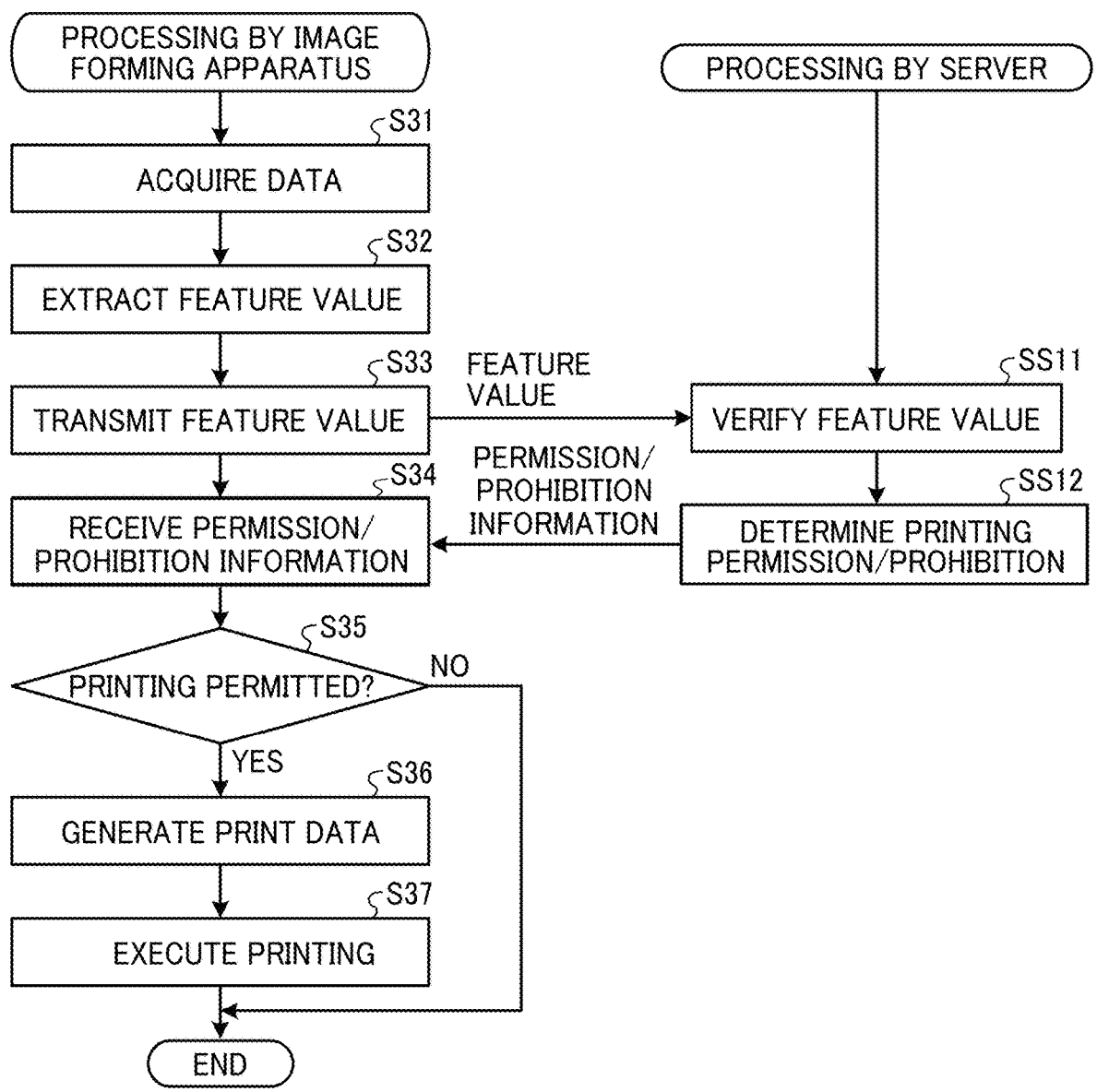
FIG. 6 is a flowchart illustrating an example of a normal printing process in which the image forming apparatus acquires data from the print server and performs normal printing.

FIG. 6 is a flowchart illustrating an example of a process performed by the image forming apparatus 3 to acquire data from the print server 4 and perform normal printing.

First, the image forming apparatus 3 acquires electronic data to be printed from the print server 4 or the like according to operation to execute printing by the user (step S31).

Subsequently, the feature value extraction unit 23 of the image forming apparatus 3 extracts the feature value of the acquired electronic data (step S32), transmits the feature value to the cloud print server 1, and requests verification thereof (step S33).

Receiving the feature value requested to be verified, the cloud print server 1 checks the degree of matching of the feature value with a plurality of feature values registered in the file F1 (step SS11). The cloud print server 1 determines whether printing is permitted and transmits printing permission/prohibition information as a result to the source of the request (step SS12).

When the image forming apparatus 3 receives the printing permission/prohibition information transmitted from the cloud print server 1 (step S34), the image forming apparatus 3 determines whether or not printing is permitted based on the received printing permission/prohibition information (step S35). In response to a determination that printing is permitted (step S35: Yes), the image forming apparatus 3 generates print data from the acquired data (step S36) and executes printing (step S37). In response to a determination that printing is prohibited (step S35: No), the image forming apparatus 3 ends the process in FIG. 6.

In this embodiment, the copying process has been described as an example, but a process using the scanning function and a process using the facsimile function are basically the same. For example, transmission of scan data or generation and transmission of facsimile data is executed instead of generation of print data and execution of printing. The image forming apparatus 3 determines whether scanning or facsimile transmission is permitted based on the printing permission/prohibition information from the server and further determines whether to accumulate data, transmit an email, or transmit a facsimile.

As described above, in the cloud printing system according to the present embodiment, the image processing apparatus 20 extracts the feature value and transmits the extracted feature value to the server 10. The server 10 checks the degree of matching of the feature value with the feature values accumulated (registered) in the server 10 and returns an output setting to the image processing apparatus 20 when the degree of matching satisfies a threshold. The output setting indicates, for example, whether printing is permitted. Accordingly, while enabling restriction of image formation, this configuration can reduce the amount of data communication between the image processing apparatus 20 and the server 10. The capacity required for the server 10 can be reduced.

Accumulating the feature values of originals in the server 10 is advantageous in preventing various types of forgery. The reliability in preventing forgery improves, and secondary determination by an administrator for preventing forgery can be omitted. Generating the result based on comparison of the feature values by the server 10 is advantageous in reducing variations in the verification for forgery prevention. Then, the system can handle not only the designated original but other originals.

The print server 4 having a configuration similar to that of the server 10 illustrated in FIG. 2 is advantageous in restricting printing even when communication with the cloud print server 1 is not established.

According to the present embodiment, the image forming apparatus 3 cancels printing of the target not to be printed, and forgery and falsification can be prevented.

In addition to printing, copying, and scanning, the feature of the present embodiment can adapt to preventing forgery by facsimile.

A description is given of a first modification.

The first embodiment concerns registering, as originals, all generated data and data identified as the original. However, registering all data as originals may be inappropriate. Some documents are not required to be registered as originals. When the server verifies that the document is an original based on the matching between feature values, adding information to the electronic data or adding handwritten information to the document are prohibited. For example, in the case of scanning a material on which a note is written during a meeting, the feature value may differ from that of the original due to the written note. Therefore, in the first modification of the first embodiment, the user can designate whether to register the feature value in the server.

The network configuration and the functional configuration of the first modification are the same as those described in the first embodiment. Below, a description is given of control for the case where the system allows the user to designate either a printing that involves registration of printing restriction (referred to as "original registration printing" or a printing operation without print registration of printing restriction (referred to as "normal printing").

Figure 7:
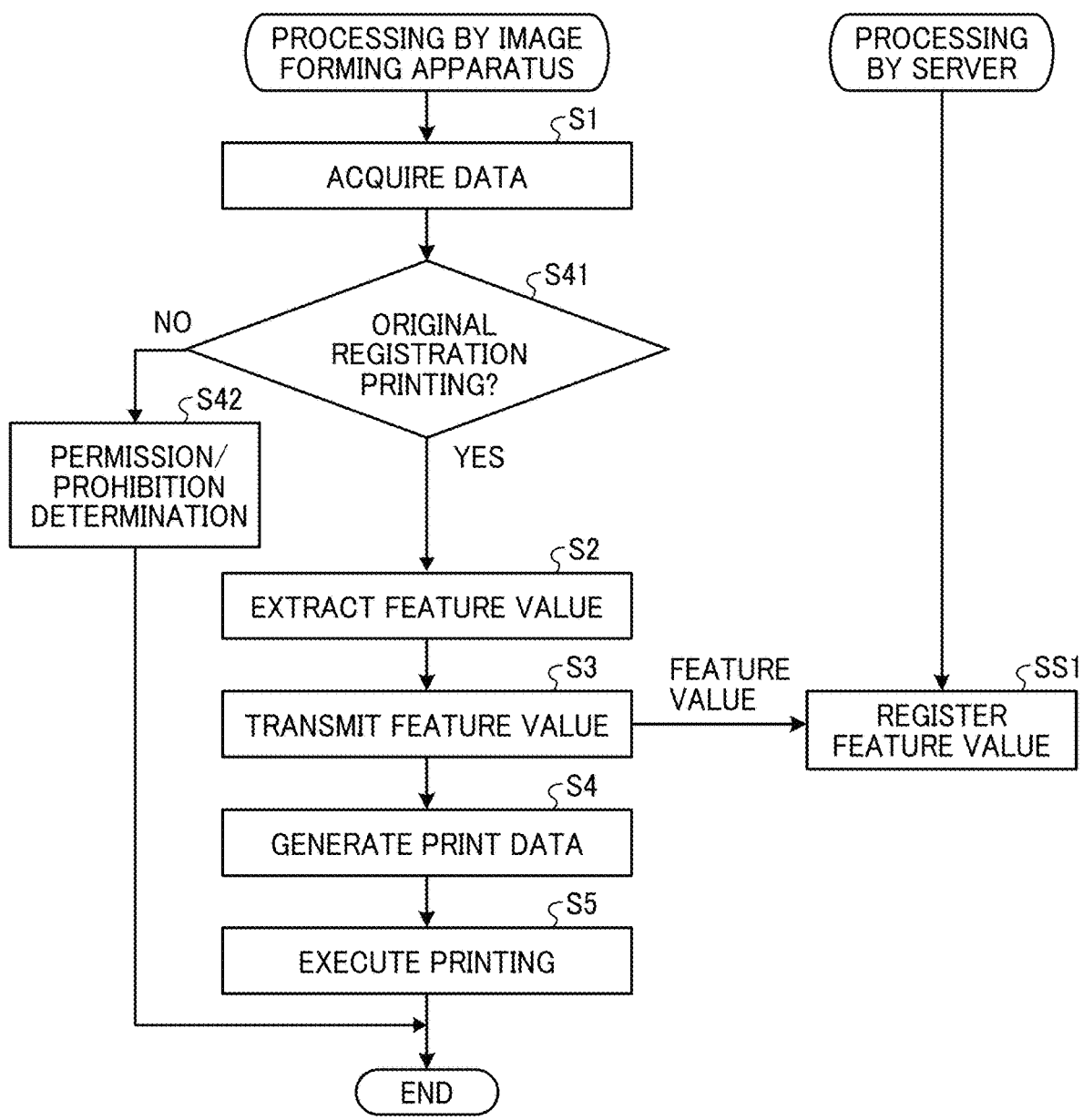
FIG. 7 is a flowchart illustrating an example of a print restriction process by the cloud printing system according to a first modification.

FIG. 7 is a flowchart illustrating an example of a print restriction process by the cloud printing system according to the first modification. In the process illustrated in FIG. 7, steps S41 and S42 are added to the process illustrated in FIG. 3. The steps same as those in FIG. 3 are denoted by the same step numbers.

As illustrated in FIG. 7, in response to reception of an instruction of printing from the communication terminal 2 or the control panel 30 by the user, the image forming apparatus 3 determines in step S41 whether the requested printing is original registration printing. For example, the control panel 30 displays a selection button for document registration print, and the receiving unit 22 (an example of a selection receiving unit) receives an instruction when the user presses the button. Note that the control panel 30 may display a button for original registration printing and a button for normal printing, and selection may be made by button selection.

In response to a determination that the printing is the original registration printing (Yes in step S41), the registration process from step S2 is executed. In response to a determination that the printing is normal printing (No in step S41), the process proceeds to step S42. In step S42, the image forming apparatus 3 performs the printing permission/prohibition determination process on the electronic data. The printing permission/prohibition determination process is, for example, the process illustrated in FIG. 6, and has already been described, so the description thereof is omitted. The registration process is the same as that illustrated in FIG. 3, and the description thereof is omitted.

With this configuration, the user can selectively perform the registration process, and an appropriate printing operation according to the document can be performed.

The system may allow the user to select either "printing permitted" or "printing prohibited" when registering an original document. For example, the control panel 30 displays selection buttons for selecting either "printing permitted" or "printing prohibited" and prompts the user to select one of the buttons at the time of original registration. In this case, the image forming apparatus 3 transmits, to the server 10, the print restriction instruction indicating that printing is permitted or prohibited selected by the user together with the feature value. In this way, the server 10 can associate the printing permission/prohibition information with each feature value in the file F1. Then, the server 10 can output "printing permitted" in response to reception of a feature value that corresponds to the feature value associated with "printing permitted" and can output "printing prohibited" in response to reception of a feature value that corresponds to the feature value associated with "printing prohibited." This configuration enables the system to determine not only whether printing is prohibited but also whether printing is permitted.

A description is given of a second modification.

The first modification concerns registering a printing-permitted original document in addition to registering a prohibited original document. There is a risk that the feature of a forged document having falsified information may match the feature of the registered printing-permitted original document and printing of the forged document is permitted. For example, unless the falsified item is the target for extraction of the feature value, the falsified information is not reflected in the feature value. Then, the feature values of the portions not falsified are compared with each other and the feature values match. Therefore, the document is not found as a forged document and is printable.

Many documents and certificates are very similar in format. When determining whether the requested printing of a document is permitted, the system may erroneously refer to information of an original different from the registered original. Alternatively, the system may compare the information of the printing-requested document with information of another registered original although the original of the printing-requested document is not registered. As a result, copying or printing may be erroneously prohibited.

In order to prevent such an error, the system can allow the user to designate the extraction item of the feature value in advance at the time of original registration. The second modification concerns the system that allows the user to designate an item to be extracted as the feature value. For example, a certificate includes an item to be certified in the document, and the content of the certified item is appropriate as an item to be extracted as a feature value. Specifically, in the case of a certificate, such as a residence card, that certifies an individual, personal information such as name, date of birth, and address are appropriate as extracted features. In the case of a certificate, such as a security or a land certificate, numerals, such as money amount and land area, are important and are appropriate as items to be extracted. Designation of extracted items is carried out, for example, by the configuration illustrated in FIGS. 8 to 10 below.

Figure 8:
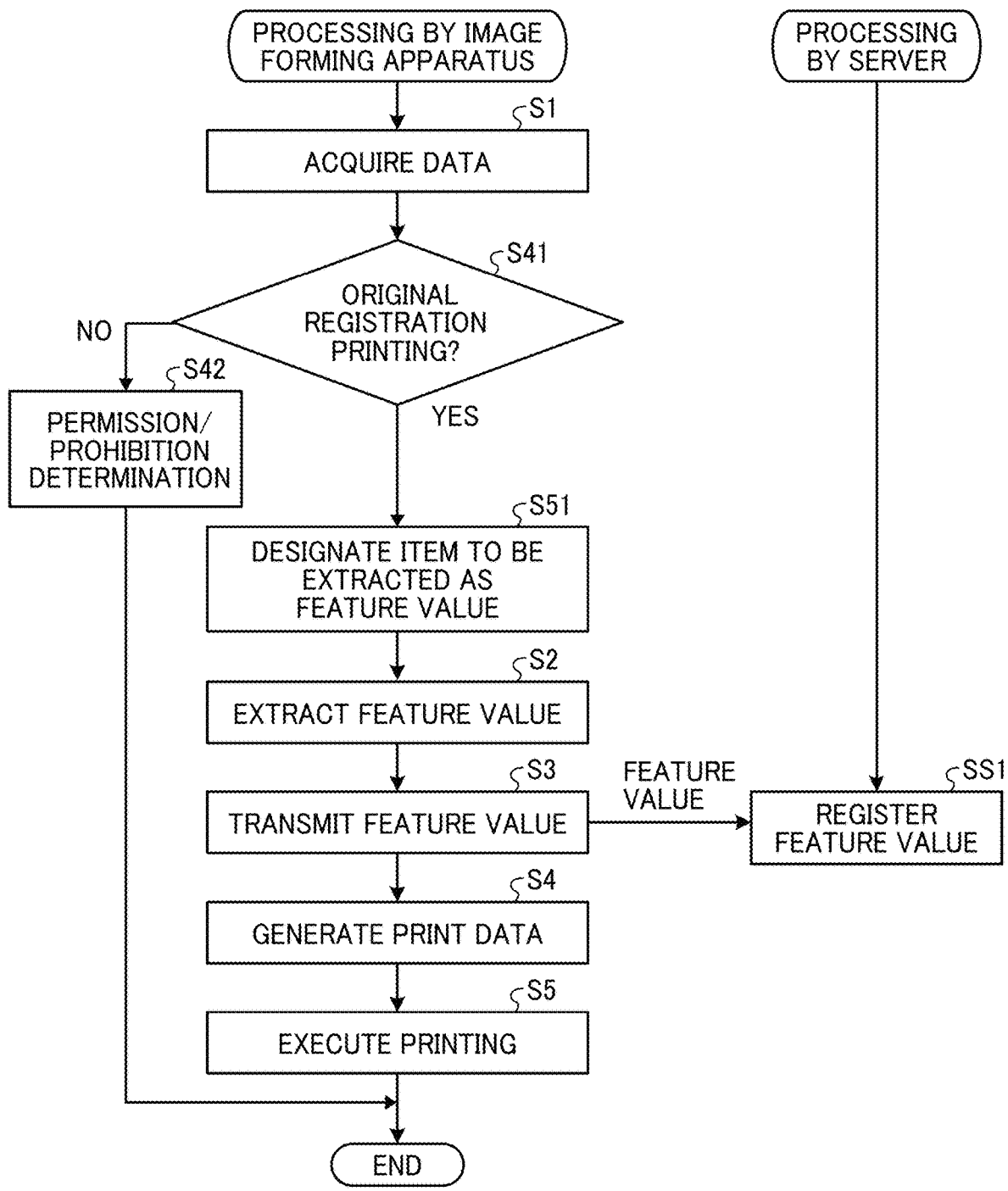
FIG. 8 is a flowchart illustrating an example of a print restriction process by the cloud printing system according to a second modification.

FIG. 8 is a flowchart illustrating an example of a print restriction process by the cloud printing system according to the second modification. FIG. 8 includes a process (step S51) of receiving an item to be extracted as a feature value from a user by a touch operation or the like. Since other steps are the same as those in FIG. 7, the same step numbers are assigned, and the description thereof is omitted.

As illustrated in FIG. 8, when the image forming apparatus 3 determines in step S41 that the print is the original registration printing, the image forming apparatus 3 designates an item to be extracted as a feature value (step S51). In step S51, for example, the receiving unit 22 (an example of a designation receiving unit) displays a preview image to be printed on the control panel 30, receives a touch operation or the like on the control panel 30 by the user, and designates the received item as the extraction item of the feature value. In the following step S2, the image forming apparatus 3 extracts the feature value for the designated item. Other steps are the same as those in FIG. 7.

FIG. 9 is a diagram illustrating an example of extracting a feature value from a designated item. FIG. 9 illustrates an image of a residence card as an example. A residence card includes personal information such as name, date of birth, address, and place of family register. The user touches the item for extracting the feature value in the image of the residence card displayed on the control panel 30. The image forming apparatus 3 extracts a feature value from a designated item. A description is given of an example in which a character print position is extracted as a feature value by preset setting or designation by the user.

In FIG. 9, in which the name is designated, for example, it is assumed that coordinates of the start point of the first character and the end point of the last character of the name are read and combined as print positions. The start point and the end point are the start point and the end point according to the stroke order of characters. Desirably, the coordinates used as the feature value have an origin set to a specific character in the document or a corner of the outer frame of format, not to be affected by the positional deviation at the time of printing. The origin may be automatically detected from the image or may be designated by the user in the image.

For example, the image forming apparatus 3 detects a corner of ruled lines from the image and sets the position thereof to the origin (0,0) of each pixel (x,y) in the lateral axis X and the vertical axis Y. Then, the image forming apparatus 3 extracts the feature value of the name of the person from the name field since the document is a standard format document. The feature value of the character such as the person's name is based on, for example, the stroke order of the character as illustrated in the example. The image forming apparatus 3 extracts the start coordinates (x1,y1) of the first stroke of the first character and the end coordinates (x2,y2) at which the last stroke of the last character ends.

Although the start point of the first character and the end point of the last character are exemplified as the print positions, the print positions are not limited thereto. For example, coordinates of a start point, an end point, and other points of a certain character in the extraction item designated by the user may be read and extracted.

In addition, although a name is given as an example, print positions of a plurality of items such as a householder and an address may be combined.

The print positions are a combination of coordinates (x,y) and can be used as a feature value as is. From the viewpoint of security, preferably, the print positions are converted into another unique feature value for transmission.

Figure 10:
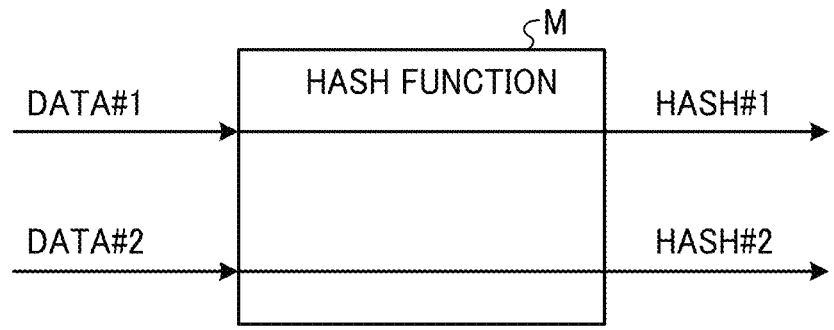
FIG. 10 illustrates a concept of an example of extracting a feature value from an item designated by a user.

FIG. 10 illustrates a concept of an example of an extraction process of a feature value from an item designated by the user. FIG. 10 illustrates a concept of an example using a hash function.

The hash function is "operation of obtaining a numerical value typifying certain data that is given, or an operation for obtaining such a numerical value."

As illustrated in FIG. 10, when given data #1 (data #2) is processed by a hash function M, a hash value #1 (hash value #2) is output. The hash value #1 (hash value #2) is a numerical value converted at random within the upper limit of the numerical values set by the hash function. The output hash values (hash value #1 and hash value #2) randomly change when the input values (data #1 and data #2) are different, but are always the same when the input values are the same.

With this hash function, the same hash value is always obtained when input values are the same, so that the hash value can also be used as the feature value. Note that the hash function may be used not only for the information of the print position in the item but also for the information extracted from the entire image.

In addition to the hash function, various methods can be considered. Other methods may be used instead of the hash function. For example, two dimensional Fourier transform may be performed on an image to extract a spatial feature value, or wavelet transform may be used to acquire a feature value. Alternatively, a feature of an image may be output from a machine learning model that has already learned features of images.

In the second modification, as an example, an image is displayed on the control panel 30 and the extraction item of the feature value is designated, but the method of designation is not limited thereto. For example, the item name may be selected from a list of item names. Alternatively, the feature values extracted from a plurality of designated items may be combined. Yet alternatively, the feature value may be extracted from information in which items are combined. Such methods may be appropriately combined.

As described above, the configuration according to the second modification can extract an appropriate item as a feature value regardless of the type and format of the document. In addition, the configuration according to the second modification can prevent erroneous detection between documents having very similar formats, such as the same type of documents having different formats depending on municipalities. Thus, the system has a high reliability in forgery prevention.

A description is given of a third modification.

When a document is forged, information in the document is often falsified. For example, in the case of a certificate that certifies an individual, personal information, such as name, date of birth, and address, may be falsified. In the case of a security or a land certificate, numerals such as money amount and land area may be falsified. In the third modification, printed character information is extracted as a feature value by preliminary setting or user designation, so as to reliably detect forgery by falsification.

FIG. 11 is a diagram illustrating an example where a printed character itself is extracted as a feature value. In the example illustrated in FIG. 11, character information, such as "ABCD" included in the item "name," "H2.3.4" included in the item "birth date," and "2-3 XXXX 1-chome, YYY city, ZZZ prefecture" included in the item "address," are designated as feature values.

The designation of items is the same as that in the second modification. In the third modification, the character information itself, not the print position of the character in the item, is used as a feature value by a preliminary setting or user designation.

In the case of residence cards, there are many people having the same name, so not only the name but also the date of birth and address are combined in the feature value.

A description is given of a fourth modification.

The fourth modification concerns a configuration in which invisible information is included in the printed matter. The invisible information is information that can be read by irradiation with light (ultraviolet light, infrared light, or the like) having a specific wavelength different from the visible light range.

Figure 12:
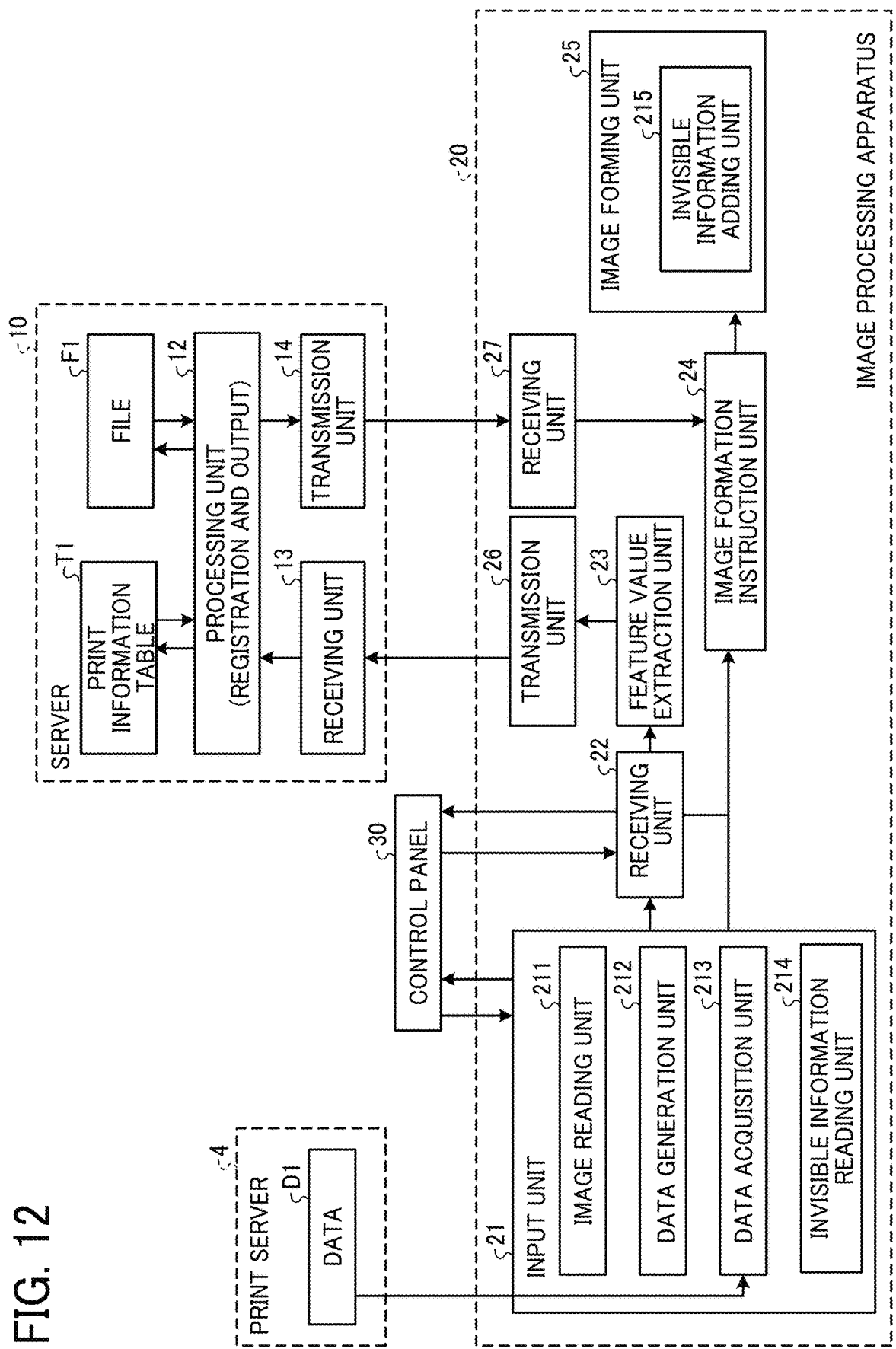
FIG. 12 is a block diagram illustrating an example of a functional configuration of an image processing apparatus and a server according to a third modification.

FIG. 12 is a block diagram illustrating an example of a functional configuration of the image processing apparatus 20 and the server 10 according to the fourth modification. The image processing apparatus 20 illustrated in FIG. 12 includes, in addition to the configuration of the image processing apparatus 20 illustrated in FIG. 2, an invisible information reading unit 214 in the input unit 21 and an invisible information adding unit 215 in the image forming unit 25. The invisible information adding unit 215 is, for example, an infrared (IR) toner image forming unit. Alternatively, for example, the image formation instruction unit 24 may generate, by image processing, print data for forming invisible information using cyan, magenta, yellow, and black toners, and the instructs the image forming unit 25 to form the invisible information according to the print data. Since other configurations are the same as those in FIG. 2, the same reference numerals as those in FIG. 2 are given.

The image processing apparatus 20 illustrated in FIG. 12 includes both the invisible information reading unit 214 and the invisible information adding unit 215. Alternatively, these functional units may be included in different image processing apparatuses 20 such that one image processing apparatuses 20 includes the invisible information reading unit 214 and another image processing apparatus 20 includes the invisible information adding unit 215.

The invisible information reading unit 214 reads the invisible information formed on a printed matter. For example, the invisible information reading unit 214 includes a light source to irradiates an original or a copy (printed matter) with light having a predetermined wavelength and an invisible light image sensor to read the light reflected from the printed matter, thereby reading invisible information printed on the original or the copy. The light having a predetermined wavelength is, for example, ultraviolet light or infrared light.

The invisible information adding unit 215 forms invisible information on the printed matter (medium) according to the print data generated by the image formation instruction unit 24. For example, the invisible information adding unit 215 supplies a material that can be read with light having a predetermined wavelength such as ultraviolet light or infrared light to a print head, and forms invisible information by applying the material from the printer head onto an original or a copy. As the invisible information, given information such as a character, a numeral, or a mark can be formed by, for example, the print head.

Next, the invisible information will be described with reference to FIGS. 13 to 19.

FIG. 13 is a diagram illustrating use of invisible information as an extraction item of the feature value. As illustrated in FIG. 13, invisible information m is formed, and the feature value extraction unit 23 extracts the invisible information m read by the invisible information reading unit 214.

The invisible information is difficult to visually recognize, so information not directly related to the document may be formed as the invisible information, or the invisible information may be formed independent of the ruled line of the document format. Therefore, by using the invisible information as the feature value, it is possible to generate a document with higher uniqueness. Such invisible information makes it easy to differentiate a document from another document having a very similar format, thereby reducing the possibility of erroneous detection and realizing forgery prevention of high reliability. Since the correct feature value can be extracted only by the device including the invisible information reading unit 214, a more secure anti-counterfeit can be realized. Use of invisible information can increase variations of the feature value and enhance the degree of security.

At the bottom of FIG. 13, the visible information and the invisible information to be combined as a feature value are illustrated. The combination includes the three items of visible information (name, birth date, and address) in the format illustrated in FIG. 13 and invisible information. The feature value may be combined with the visible information in this way, or only the invisible information may be used.

FIG. 14 is a diagram illustrating adding invisible information indicating a print execution condition. The invisible information adding unit 215 can add a print executing condition m1 (indicating "printable when xx is satisfied") to the document. In this case, the image processing apparatus 20 extracts the print execution condition m1 together with the feature value from the document, and transmits the content of the print execution condition m1 to the server 10. The server 10 can determine printing permission/prohibition based on not only the feature value but also the print execution condition. Therefore, for example, even when printing is not permitted by the determination based only on the feature value, the printing permission/prohibition is changed when the print execution condition is satisfied. Note that FIG. 14 illustrates an example in which the print execution condition is directly printed on the document although the information is invisible. Alternatively, the added print execution condition may be in the form converted into a two dimensional code, a three dimensional code, a number, a symbol, or another character string. In the following examples, the form of the invisible information is the same, although not specifically described.

In this way, the system can add, to a document, visibly unrecognizable information indicating whether or not printing is permitted and realize forgery prevention with a higher degree of security.

FIG. 15 is a diagram illustrating a case of adding information indicating whether copying is permitted as invisible information. With the invisible information adding unit 215, copying permission/prohibition information m2 can be added to the document. In this case, the image processing apparatus 20 extracts the copying permission/prohibition information m2 together with the feature value from the document, and transmits the content of the copying permission/prohibition information m2 to the server 10. The server 10 can determine printing permission/prohibition based on not only the feature value but also the copying permission/prohibition information and can flexibly change copying permission to copying prohibition and vice versa.

In this way, the system can add, to a document, visibly unrecognizable information indicating whether or not copying is permitted and realize forgery prevention with a higher degree of security.

FIG. 16 is a diagram illustrating a case of adding information indicating the limit on the number of times of copying as invisible information. With the invisible information adding unit 215, copy number limit information m3 can be added to the document. For example, the copy number limit information m3 indicates "number of copies limited to 5 times." The server 10 acquires, together with the feature value, the copy number limit information m3 read by the invisible information reading unit 214, and counts and records the number of copies of the target document upon each copying. When the number of times of copying reaches the number of times indicated by the copy number limit information m3 added to the document, the server 10 rejects subsequent copying requests.

In this way, the system can add, to a document, visibly unrecognizable information indicating limit on the number of times of copying and realize forgery prevention with a higher degree of security.

FIG. 17 is a diagram illustrating a case of adding information of a copying expiration date as invisible information. With the invisible information adding unit 215, copying expiration date information m4 can be added to the document. For example, the copying expiration date information m4 indicates Jun. 20, 2020. The server 10 acquires, together with the feature value, the copying expiration date information m4 read by the invisible information reading unit 214, and determines whether copying is permitted based on the copying expiration date information m4. That is, whether or not copying is permitted is determined based on whether the current date (and time) corresponds to the copying expiration date, and copy requests are rejected after the copying expiration date.

In this way, the system can add, to a document, visibly unrecognizable information indicating copying expiration date and realize forgery prevention with a higher degree of security.

FIG. 18 is a diagram illustrating a case of adding invisible information indicating an apparatus allowed to execute printing. With the invisible information adding unit 215, print-executable apparatus information m5 can be added to the document. The server 10 acquires, together with the feature value, the print-executable apparatus information m5, such as an apparatus identifier (ID), read by the invisible information reading unit 214, and determines whether printing is permitted based on the print-executable apparatus information m5. That is, the server 10 determines whether printing is permitted based on whether the sender apparatus of the print request has designated printing by the image forming apparatus 3 that is the print-executable apparatus. The server 10 rejects the print request when the designated image forming apparatus 3 is not the print-executable apparatus.

In this way, the system can add, to a document, visibly unrecognizable information indicating limitation on print-executable apparatus and realize forgery prevention with a higher degree of security.

FIG. 19 is a diagram illustrating a case of adding invisible information indicating a user allowed to execute printing. With the invisible information adding unit 215, print-executable user information m6 can be added to the document. The server 10 acquires, together with the feature value, the print-executable user information m6, such as a user ID, read by the invisible information reading unit 214, and determines whether printing is permitted based on the print-executable user information m6. That is, the server 10 determines whether printing is permitted based on whether the login ID to the sender apparatus of the print request corresponds to the print-executable user. The server 10 rejects the print request from any user not the print-executable user. In this way, the system can add, to a document, visibly unrecognizable information indicating limitation on print-executable user and realize forgery prevention with a higher degree of security.

In the case of permitting a plurality of users to print a document, user IDs of all users permitted to perform printing may be added to the document. Alternatively, the server 10 may store a group of print-executable users and add information identifying the group to the document.

In this way, the system can add, to a document, visibly unrecognizable information indicating limitation on print-executable user and realize forgery prevention with a higher degree of security.

According to an aspect of the present disclosure, an image forming apparatus includes a feature value extraction unit configured to extract a feature value from data, a transmission unit configured to transmit the feature value to a server, a receiving unit configured to receive an output setting corresponding to the feature value from the server, an image formation instruction unit configured to instruct formation of an image in accordance with the output setting, and an image forming unit configured to form an image in response to an instruction from the image formation instruction unit.

Although examples of embodiments of the present disclosure and modifications thereof have been described above, the above-described embodiments are not intended to limit the scope of the present disclosure. Such embodiments and modifications may be modified into a variety of other forms. Various omissions, substitutions, and changes in the above-described embodiments and modifications may be made without departing from the spirit of the present disclosure. Such embodiments and modifications are within the scope and gist of this disclosure and are also within the scope of appended claims and the equivalent scope.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. An information processing system comprising:
    a server comprising:
        a memory that stores a registered feature value of data; and
        first circuitry; and
    an image processing apparatus connectable via a network to the server, the image processing apparatus comprising second circuitry configured to extract a feature value from data and transmit the feature value to the server,
    the first circuitry being configured to:
        receive the feature value transmitted from the image processing apparatus;
        output an output setting depending on whether the received feature value matches the registered feature value in the memory; and
        transmit the output setting to the image processing apparatus;
    the second circuitry being configured to:
        receive, from the server, the output setting associated with the feature value; and
        instruct an image forming device to form an image based on the output setting,
        wherein the registered feature value and the feature value of data include parameters corresponding to a plurality of parts of an image.

2. The information processing system according to claim 1,
    wherein the second circuitry selectively receives an instruction on whether to register, in the server, the extracted feature value, and
    wherein the server registers the feature value in the memory in response to reception of an instruction to register the feature value.

3. The information processing system according to claim 1,
    wherein the data from which the feature value is extracted is one of print data based on which the image forming device forms an image or scan data obtained by scanning of a medium.

4. The information processing system according to claim 1,
    wherein the server is a cloud print server or a local print server.

5. The information processing system according to claim 1,
    wherein the second circuitry receives a user operation of designating an extraction target from which the feature value is extracted.

6. The information processing system according to claim 5,
    wherein the second circuitry extracts, as the feature value, a print position within the extraction target designated by the user operation.

7. The information processing system according to claim 5,
    wherein the second circuitry extracts, as the feature value, print character information within the extraction target designated by the user operation.

8. The information processing system according to claim 1,
    wherein the image processing apparatus further includes:
        an invisible light source configured to irradiate a medium with invisible light; and
        an invisible light image sensor configured to receive the invisible light reflected from the medium, to read invisible information on the medium.

9. The information processing system according to claim 8,
    wherein the data includes invisible information, and the second circuitry extracts the feature value from the invisible information.

10. The information processing system according to claim 9,
    wherein the image processing apparatus includes the image forming device configured to form the image on the medium,
    wherein the image forming device adds the invisible information to the medium.

11. The information processing system according to claim 9,
    wherein the invisible information includes restriction information on a number of times of copying, and
    wherein the server:
        receives the restriction information being the invisible information read by the invisible light image sensor; and
        outputs the output setting according to the restriction information.

12. The information processing system according to claim 9,
    wherein the invisible information includes a copying expiration date, and
    wherein the server:

receives the copying expiration date being the invisible information read by the invisible light image sensor; and outputs the output setting according to the copying expiration date.

13. The information processing system according to claim 9, wherein the invisible information includes restriction information on an apparatus permitted to form an image according to the output setting, and wherein the server:

receives the restriction information being the invisible information read by the invisible light image sensor; and outputs the output setting according to the restriction information.

14. The information processing system according to claim 9, wherein the invisible information includes restriction information on a user permitted to output an image according to the output setting, and wherein the server:

receives the restriction information being the invisible information read by the invisible light image sensor; and outputs the output setting according to the restriction information.

15. The information processing system according to claim 8, wherein the invisible information includes a print execution condition, and wherein the second circuitry changes the output setting based on the print execution condition read by the invisible light image sensor from the invisible information.

16. The information processing system according to claim 15, wherein the print execution condition indicates whether copying is permitted.

17. The information processing system according to claim 1, wherein the image processing apparatus is an image forming apparatus including the image forming device.

18. The information processing system according to claim 1, wherein the registered feature value and the feature value of data is presentable as a set of numerals indexed from the parameters.

19. A method for restricting replication of data, the method comprising:

extracting a feature value from data;

transmitting the feature value to a server;

receiving an output setting associated with the feature value from the server based on a comparison between the feature value and a registered feature value stored by the server; and instructing an image forming device to form an image according to the output setting, wherein the feature value and the registered feature value include parameters corresponding to a plurality of parts of an image.

20. A non-transitory recording medium storing a plurality of program codes which, when executed by one or more processors, causes the processors to perform a method, the method comprising:

extracting a feature value from data;

transmitting the feature value to a server;

receiving an output setting associated with the feature value from the server based on a comparison between the feature value and a registered feature value stored by the server; and instructing an image forming device to form an image according to the output setting wherein the feature value and the registered feature value include parameters corresponding to a plurality of parts of an image.

* * * * *